Figure 1:
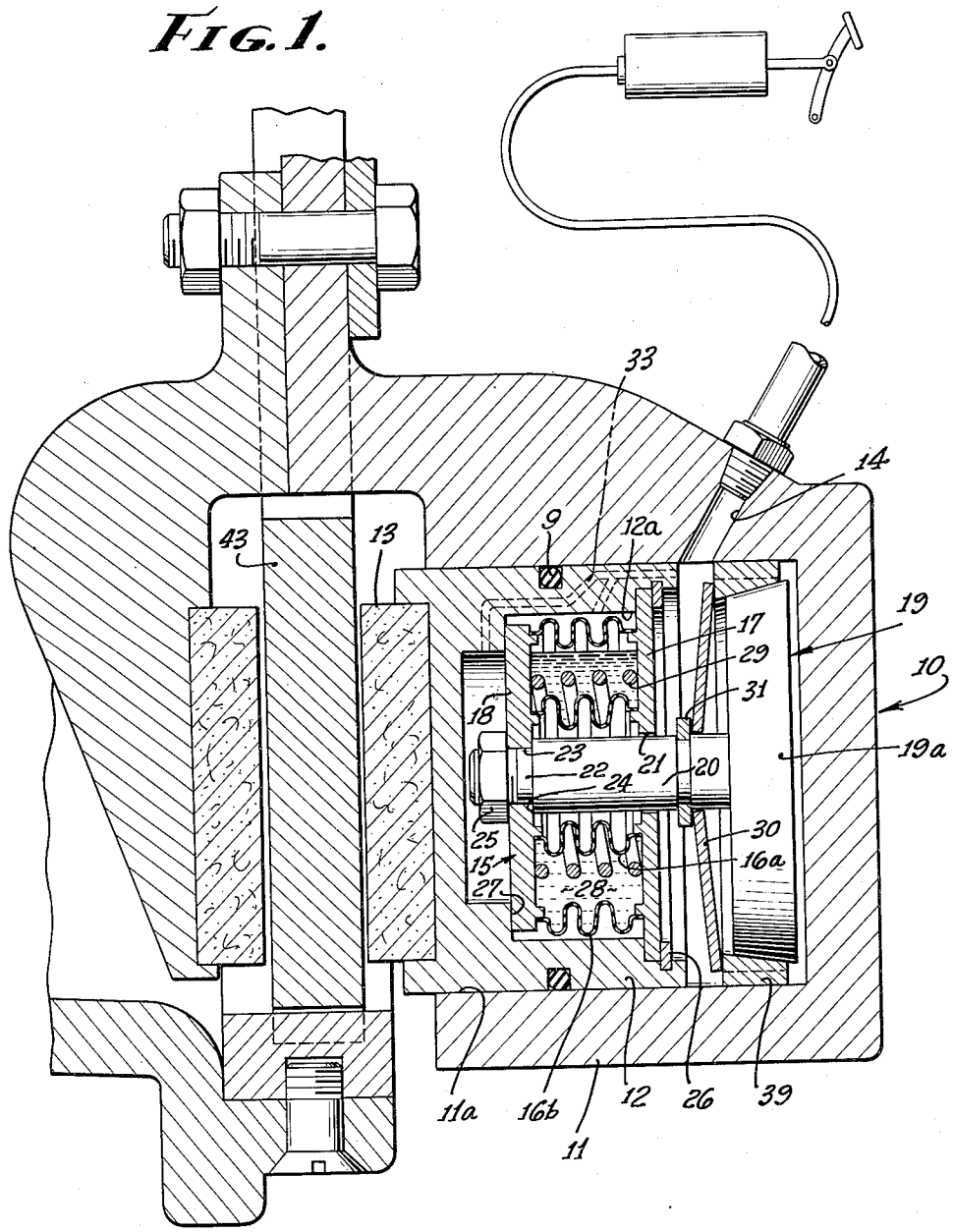

Aug. 8, 1961  D. W. JEFFRIES  2,995,216
SELF-ADJUSTING BRAKE OR CLUTCH MECHANISM
Filed April 24, 1959  2 Sheets-Sheet 1

INVENTOR.
DAN W. JEFFRIES
BY
Flam and Flam
ATTORNEYS.

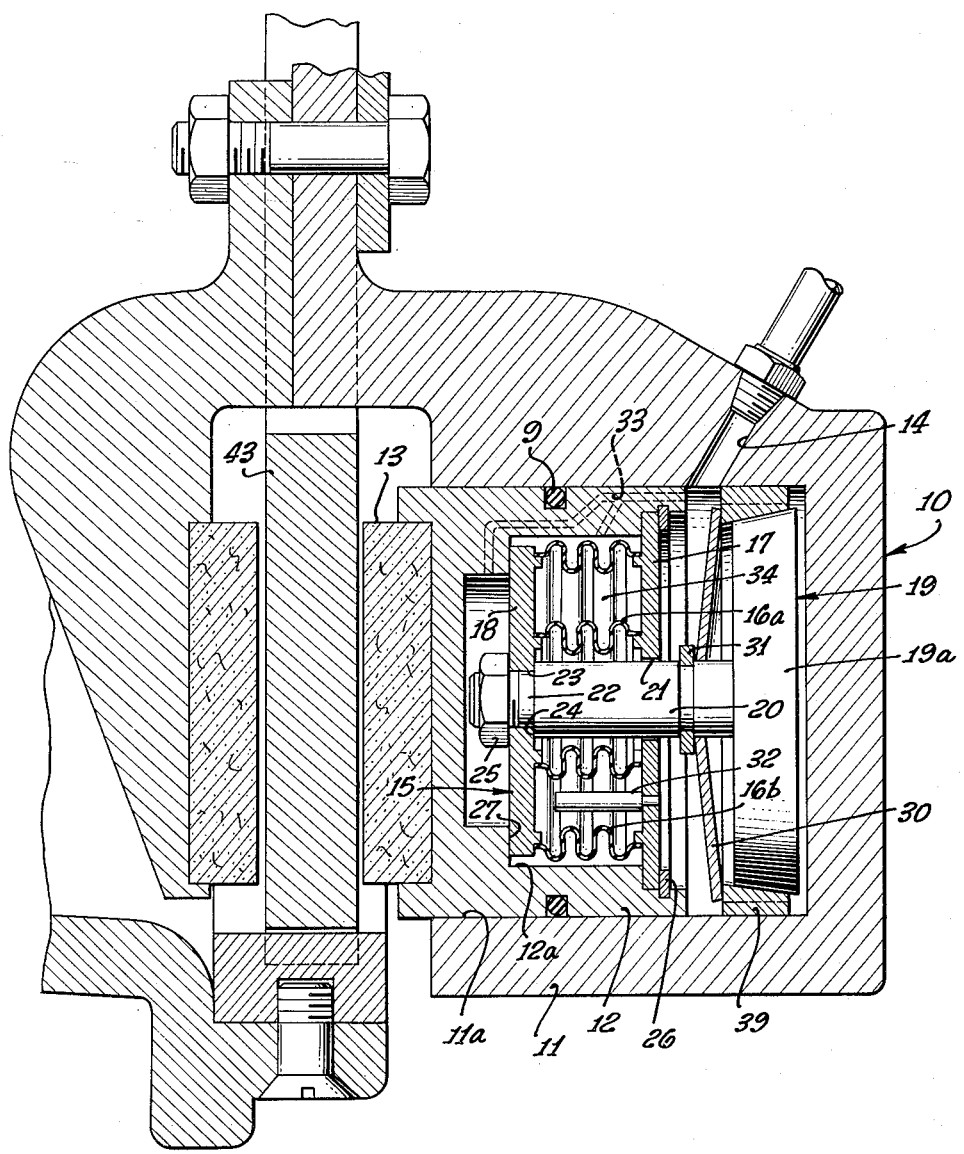

United States Patent Office 2,995,216
Patented Aug. 8, 1961

2,995,216
SELF-ADJUSTING BRAKE OR CLUTCH MECHANISM
Dan W. Jeffries, Los Angeles, Calif., assignor of one-half to Garal Mfg. Corp., doing business as Nash Engineering Co., Lynwood, Calif., a corporation of California
Filed Apr. 24, 1959, Ser. No. 808,614
8 Claims. (Cl. 188—73)

This invention relates to a fluid operated actuator for brake or clutch mechanisms. Particularly, this invention relates to the type of actuator disclosed and claimed in my copending application, Serial No. 723,495, filed March 24, 1958, and entitled Self-Adjusting Brake or Clutch Mechanism.

Various actuator structures achieve compensation for the wear of friction surfaces usually carried by them. Thus, for example in a patent to Cagle, No. 2,644,549, issued July 7, 1953, there is shown a piston carrying, for limited lost motion with respect thereto, a device frictionally gripped by the support. A spring interposed between the piston and the friction device moves the piston to a limit relative to the device corresponding to clearance or release. But before such movement is possible, the spring must be caused to store energy by movement of the piston to the other limit when the device is retarded. While this arrangement achieves compensation for wear by reducing clearance, it does not achieve compensation for other and possibly opposite factors, as for example, heat expansion or deflection of the support. Loss of clearance thus removes stored energy from the spring while the parts move to the limit usually achieved when clearance is restored. This invention relates to an improved device that utilizes means responsive to the application of fluid pressure for storing energy for later retraction of the piston. Such a device operates for conditions corresponding to decrease of clearance, as well as to conditions corresponding to increase in clearance because the movement of the parts doesn't affect such storing of energy. In my prior copending application, there is disclosed a supplemental piston arrangement that serves as the means responsive to the application of fluid pressure for accomplishing such functions. However, various moving seals are provided in order to ensure appropriate operation. Such seals deteriorate with age, heat, wear, etc. They are furthermore subject to damage, perhaps during physical assembly of parts.

Since seals are subject to age deterioration, there is a definite shelf life for replacement parts. Obviously the brake system is no better than the seals that ensure its operation. Accordingly, the primary object of this invention is to provide supplemental fluid pressure operated device achieving compensation both for negative clearance and positive clearance that requires no extra moving seals at all.

Another object of this invention is to provide a simplified actuator structure of the foregoing characteristics.

In carrying out the invention, I make novel use of a bellows structure. The bellows has end walls capable of attachment to the piston and the friction device respectively to serve as a means for effecting a lost motion connection therebetween. The bellows is subjected to the pressure of fluid in the piston space and thus in a manner responsive to pressure, moves the parts to one relative limited position. The bellows structure furthermore may be made so that it serves as the means whereby energy is stored for subsequent restoration of clearance. Incompressible fluid may however, serve as the means for limiting movement of the piston and the friction device.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIGURE 1 is a fragmentary sectional view of a wheel and illustrating in longitudinal section the improved brake mechanism; and FIG. 2 is a sectional view similar to FIG. 1, but illustrating a modified form of the present invention.

The brake unit 10 includes the support 11 in which a piston 12 is movable. The support 11 accordingly provides a recess 11a. The piston 12 carries in a peripheral groove an O-ring 9 that maintains a seal between the support 11 and the piston 12 as the piston moves. It may be noted that no other seal exists for the brake unit 10.

The piston 12 carries friction material 13 for engagement with a disk, drum, or shoe 43 that is carried by the structure to be engaged by the brake.

The piston 12 is urged outwardly of the recess 11a by application of fluid pressure within the cylinder space. Fluid is admitted via a supply port 14 formed in the support 11.

The piston 12 is retracted by the aid of a bellows unit 15 in a manner to be described more fully hereinafter. The bellows unit includes in this instance concentric inner and outer generally cylindrical flexible walls 16a and 16b. The ends of the walls 16a and 16b are secured to end or parts 17 and 18 in a suitable manner. A sealed, generally annular space is accordingly formed by the bellows wall 16a and the end plates 17 and 18.

The bellows unit 15 is mounted upon a gripper assembly 19. The gripper assembly 19 includes a disk 19a that is located behind the piston 12 in the recess 11a. The gripper assembly 19 has an integral stem 20 that projects centrally into a rearwardly opening recess 12a of the piston 12. The bellows unit 15 is mounted at the end of the stem and within the piston 12 so that a compact arrangement is achieved.

The gripper stem 20 projects through an aperture 21 in the plate 17 and through the inner bellows wall 16a. The reduced end 22 of the stem 20 projects through an aperture 23 formed in the other plate 18. The bellows unit 15 is secured to the stem 20 by the aid of a nut 25 mounted upon the projecting reduced stem end 22. The nut 25 urges the plate 18 against a shoulder 24 formed by the reduced stem end 22.

Engagement between the piston 12 and the bellows unit for purposes of retraction of the piston 12 is achieved by the aid of a snap ring 26 mounted in an internal groove near the outer end of the piston recess 12a. This snap ring 26 is engaged by the peripheral portion of the end plate 17.

It is the expansion of the bellows, that is the movement of the plate 17 away from the plate 18, that causes the retracting movement of the piston 12, and in a manner to be explained more hereinafter. The plate 17 moves toward the bottom of the recess 11a to retract the piston 12 until the separation between the plates 17 and 18 corresponds to the distance between the snap ring 26 and an internal shoulder 27 formed at the inner end of the piston recess 12a. Thus, the shoulder 27 by engagement with the end plate 18 determines the limit to the retracting movement of the piston 12. The force for retracting the piston 12 is derived from the spring characteristics of the walls 16a and 16b of the bellows unit, itself. However, if necessary, a spring 29 located within the bellows unit 15 may supplement the inherent spring force of the bellows unit.

The position of the bellows unit 15 determines the retracted position of the piston 12 in order that the clearance be maintained despite numerous variables to be described hereinafter. It is obviously necessary that the position of the bellows 15, itself, be adjustable. It is for this purpose that the gripper assembly 19 is provided. Thus the disk 19a of the gripper assembly 19 carries a gripper ring 39 that is forced into frictional engagement with the support recess 11a. This is accomplished by the aid of a spring washer 30 mounted upon the stem 20. The gripper ring 39 and the spring washer 30 operate in much the same manner as described in my co-pending application above-identified.

The bellows unit 15 is collapsed upon application of fluid pressure behind the piston 12. It may be noted that the plates 17 and 18 are both subjected to the fluid pressure within the recess 11a. Appropriate vents 33 and ports may be provided for this purpose. Fluid 28 within the bellows unit 15 serves several unique functions. One of them is to limit the extent that the bellows may collapse. The fluid 28 is injected between the walls 16a and 16b of the bellows unit 15 with the bellows assembly partially collapsed. On release of collapsing force, a partial vacuum is formed by the spring effort of the bellows walls and the compression spring if present. It may be noted that in the position shown, the bellows unit has expanded beyond the volume of the liquid 28, the end plate 18 of the bellows engaging the shoulder 27 of the piston 12. The manner in which the brake unit 10 operates may now be described.

When fluid pressure is applied through port 14, appropriate vents 33 allow the force to act uniformly over all surfaces of piston 12 to the O-ring seal, recess 11a, and the encased elements of the adjuster mechanism. Assuming excessive clearance wherein piston 12 and friction material 13 are not proximate to brake disk 33, the force acting on piston 12 will urge it outwardly. The friction between gripper ring 39 and support 11 is induced by the spring 30. The spring 30 urges the gripper ring 39 against the conical peripheral surface of the gripper disk 19a, with resultant side loading against the support 11. The wedging action is sufficiently great to ensure that, when piston 12 moves outwardly, gripper ring assembly 19 will remain static, thus causing bellows assembly 15 to collapse until a fluid lock occurs, at which time the continued forward movement of piston 12 results in relative movement between gripper assembly 19, and support 11.

On release of fluid pressure, the energy stored in bellows assembly 15 results in extension, which moves piston 12 rearward with respect to gripper ring assembly 19, which is frictionally statically engaged to housing 11. The piston 12 and friction material 13 will now be in the proper clearance relationship to the disk 43. Fluid pressure necessary to accomplish the above is a function of the area of piston 12 as against friction of gripper assembly, other friction losses not considered, and will occur at a small fraction of the normal operating pressure of the clutch or brake system. Under the conditions described above, the bellows assembly has functioned merely to store energy for retraction, as the system pressure against the end plates of the bellows is not significant at the pressure required to move the piston 12 outwardly if excessive clearance exists.

Assuming insufficient clearance or a dragging clutch or brake condition, fluid pressure is introduced, and piston 12 cannot be moved outwardly. The fluid pressure in recess 11a acts uniformly over bellows walls 16a and 16b, and against end plates 17 and 18. Relative radial rigidity of the walls 16a and 16b precludes collapsing inwardly, but the flexible nature of the walls 16a and 16b in a longitudinal direction results in relative movement between end plates 17 and 18. End plate 17, being retained by snap ring 26 in piston 12, is held static with respect to piston 12. End plate 18, being affixed to gripper assembly 19 by stem 20 and nut 25, is in effect frictionally engaged with support 11. When fluid pressure is sufficient on end plates 17 and 18 to collapse bellows assembly 15, and overcome friction grip between gripper assembly and support 11, end plate 17 and attached assembly will be forced rearward to the extent of collapse of the bellows assembly. It may be noted that the force applied, by end plate 18 to stem 20 and disk 19a tends to relieve the side pressure of gripper ring 29, which ring 39 is seated against disk 19a only by spring action. As this side pressure is reduced, and as disk 19a moves rearward, spring 30 moves gripper ring 39 rearward in a follow-up manner. It will be seen that gripper assembly 19 is now moved rearward with respect to support 11, the bellows assembly is collapsed, and on release of pressure, the stored energy in the bellows assembly will, through frictional coupling of gripper assembly and support, move piston 12 rearward to establish clearance.

Assuming normal clearance exists, pressure is applied through port 14, piston 12 moves outwardly, collapsing bellows assembly 15, through frictional coupling between gripper assembly 19 and support 11. As additional pressure is applied, flexure of support 11, and compressibility of friction materials as at 13, will result in additional outward movement of piston 12, which will carry gripper assembly with it, causing relative movement between piston 12 and the gripper assembly (which now must move with piston 12) and support 11. It will be noted that as piston 12 moves outwardly, with bellows assembly collapsed, force is applied through stem 20 and disk 19a to gripper ring 39, and in such a manner as to increase the side load and hence the frictional coupling value of assembly 19a with support 11. The reduced force for rearward movement of gripper assembly 19, and the increased force for movement forward of the gripper assembly is for the purpose of ensuring two results. Firstly, for rearward movement, it is important that the fluid pressure necessary to overcome the bellows assembly to collapse it and to overcome the frictional coupling of the gripper assembly be, as low as possible, considerably lower than the normal operating pressure of the braking system for obvious reasons. Secondly, it is important that the friction coupling of gripper assembly 19 be appreciably higher than the force required to collapse bellows assembly 15, in order that retraction will always occur. If frictional coupling were less than the bellows collapse force, no clearance would be obtained.

On release of pressure, the force exerted rearward on piston 12 through friction material 12 results in rearward motion of piston 12, and as the bellows is in a collapsed position at the start of the release, an opposing force to that of the collapsed bellows is introduced through the frictional coupling between gripper assembly 19 and support 11. At the time when the collapsing force of the system fluid pressure on the bellows is equal to the spring force of the bellows assembly and the frictional coupling between assembly 19 and support 11, grip ring 39 becomes static, and the piston 12 and end plate 17 of bellows assembly 15 will return together.

With respect to the fluid in the bellows assembly, when the bellows has been collapsed, pressure within the bellows will be approximately that of the fluid in recess 11a, and due to the virtual incompressibility of the fluid contained, stress on the bellows assembly is negligible. Fluid would not be necessary in low pressure systems operating within the acceptable stress levels of the materials used in the bellows assembly. Thus, in the form illustrated in FIG. 2, there is provided a gas having suitable energy storing properties. The incompressible fluid is deleted. The gas pressure serves as a means for moving the plates 17 and 18 apart upon release of fluid pressure.

In the present instance, internal stops 32 are provided for limiting movement of the plates 17 and 18 toward each other.

The inventor claims:

1. In a brake structure or the like having a support member and an actuating member relatively movable in opposite directions respectively for engaging and releasing functions, the combination therewith of means forming a space for admission of pressurized fluid between the members for urging the members toward engaging position; friction means yieldingly gripping one of said members; means determining limited lost motion between said friction means and the other of said members, and having first and second opposite positions; means capable of storing energy and acting to move the lost motion means to the first limited position thereby to urge the members to releasing position; and means independent of the movement of the members and responsive to application of fluid pressure for moving the lost motion means to the second limited position and to store energy in said energy storing means, comprising a sealed element having flexible wall means and located entirely in said space.

2. In a brake structure or the like having a support member and an actuating member relatively movable in opposite directions respectively for engaging and releasing functions, the combination therewith of means forming a space for admission of pressurized fluid between the members for urging the members toward engaged position; friction means engaging one of the members and capable of yielding upon the existence of adequate force to move in said directions; a pair of parts movable with respect to each other in said directions between predetermined limits, the parts being connected to said friction means and the other of said members; means capable of storing energy and normally moving said parts toward one limit corresponding to releasing position; flexible wall means joining the parts and forming a sealed chamber; said flexible wall means and said parts being subjected to the fluid pressure of said space for movement of said parts toward the other limit without dependence upon the movement of said members, movement of said parts toward said other limit storing energy in said energy storing means that is capable of moving said members to released position.

3. The combination as set forth in claim 2 in which said sealed element is located entirely in said space, and in which incompressible fluid is accommodated within said sealed chamber, the volume of said fluid being substantially exceeded by said chamber when the parts are at said one limit.

4. The combination as set forth in claim 3 in which said incompressible fluid determines the other limit to the movement of said parts upon diminution of the volume of the sealed chamber to a value corresponding to that of said fluid.

5. The combination as set forth in claim 2 in which the support member has a cylindrical recess forming said space; in which the actuating member is a piston movable in the recess and having an outer end and an inner end; in which the parts, the flexible walls and the energy storing means are all located within said recess adjacent the inner end of said piston.

6. The combination as set forth in claim 2 in which compressible fluid is accommodated within said sealed chamber to serve at least in part as the means for storing energy.

7. The combination as set forth in claim 5 in which said flexible walls comprise concentric generally tubular inner and outer portions, said parts comprising end plates fastened to the ends of the flexible wall portions to form a bellows, the plates having apertures registering with the inner flexible wall portions; the inner end of the piston having a recess within which the bellows is located; the friction means including a disk located between the inner end of the support member recess and the inner end of said piston; a gripper ring carried by the disk and engaging the walls of the support member recess; and a stem attached to the disk and extending through the inner flexible wall portion as well as the apertures of said end plates and attached to that end plate nearer the end of the stem; and a ring carried within an internal groove of the piston and engaged by the other end plate of the bellows; the piston also carrying means engageable with the end plate that is attached to the stem to determine said one limit to the movement of said parts.

8. The combination as set forth in claim 7 in which incompressible fluid is accommodated within the bellows, the volume thereof being exceeded by said bellows when said parts are at said one limit, said incompressible fluid in said bellows determing the said other limit when the volume of said bellows diminishes to a value corresponding to that of said fluid.

References Cited in the file of this patent

UNITED STATES PATENTS

| 1,217,507 | Sanford | Feb. 27, 1917 |
| 2,392,970 | Bricker | Jan. 15, 1946 |
| 2,644,549 | Cagle | July 7, 1953 |
| 2,817,421 | Bricker | Dec. 24, 1957 |